(12) United States Patent
Brevick

(10) Patent No.: US 9,957,886 B2
(45) Date of Patent: May 1, 2018

(54) HOOP SPRING IN A PRESSURE REACTIVE PISTON

(71) Applicant: Ford Global Technologies, LLC, Dearborn, MI (US)

(72) Inventor: John Edward Brevick, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/648,879

(22) Filed: Jul. 13, 2017

(65) Prior Publication Data
US 2017/0306838 A1    Oct. 26, 2017

Related U.S. Application Data

(62) Division of application No. 14/693,686, filed on Apr. 22, 2015.

(51) Int. Cl.
| | |
|---|---|
| *F02B 75/04* | (2006.01) |
| *F02D 13/02* | (2006.01) |
| *F02P 5/15* | (2006.01) |
| *F02D 15/04* | (2006.01) |

(52) U.S. Cl.
CPC ........ *F02B 75/044* (2013.01); *F02D 13/0207* (2013.01); *F02D 15/04* (2013.01); *F02P 5/151* (2013.01); *Y02T 10/18* (2013.01)

(58) Field of Classification Search
CPC . F02B 53/02; F02B 75/044; F02F 3/00; F02F 3/02; F02F 5/00; F02P 13/00
See application file for complete search history.

(56) References Cited

U.S. PATENT DOCUMENTS

| | | | | |
|---|---|---|---|---|
| 2,170,266 A | * | 8/1939 | Leissner | F02B 75/044 123/76 |
| 3,107,905 A | | 10/1963 | Lucas | |
| 3,226,046 A | * | 12/1965 | Droll | H02K 15/085 242/432.3 |
| 3,311,096 A | * | 3/1967 | Carney | F02B 75/044 123/78 R |

(Continued)

OTHER PUBLICATIONS

Brevick, J., "Pressure Reactive Variable Compression Ratio Piston Development," US Department of Energy—Office of Transportation Technologies, Combustion and Emission Control for Advanced CIDI Engines, FY 2001 Progress Report, Nov. 2001, 7 pages.

(Continued)

*Primary Examiner* — Lindsay Low
*Assistant Examiner* — Long T Tran
(74) *Attorney, Agent, or Firm* — Greg Brown; McCoy Russell LLP

(57) ABSTRACT

Systems and methods are provided for varying a compression ratio in an engine having a pressure reactive piston. The pressure reactive piston may include a piston crown, and a spring positioned within the piston crown, wherein the spring includes a first ring, a second ring comprising a plurality of apertures, a rolling element positioned within each of the plurality of apertures, and a third ring. The first ring, the second ring, and the third ring of the spring may be arranged concentrically and the second ring may be positioned between the first ring and the third ring.

14 Claims, 7 Drawing Sheets

(56) References Cited

U.S. PATENT DOCUMENTS

| | | | |
|---|---|---|---|
| 3,375,000 A | 3/1968 | Seamands et al. | |
| 3,682,466 A | 8/1972 | Huchette et al. | |
| 5,483,929 A * | 1/1996 | Kuhn | F01L 1/00 |
| | | | 123/90.1 |
| 5,544,715 A | 8/1996 | Phillips | |
| 5,755,192 A * | 5/1998 | Brevick | F02B 75/044 |
| | | | 123/78 B |
| 6,230,852 B1 | 5/2001 | Trustee | |
| 6,318,899 B1 | 11/2001 | Boyd | |
| 6,568,357 B1 | 5/2003 | Rao et al. | |
| 6,736,091 B1 * | 5/2004 | Tibbles | F02B 75/045 |
| | | | 123/78 E |
| 6,907,849 B2 * | 6/2005 | Galvin | F02B 75/38 |
| | | | 123/48 A |
| 7,273,022 B2 * | 9/2007 | Valdivia | F02B 75/044 |
| | | | 123/193.6 |
| 7,318,397 B2 * | 1/2008 | Ward | F02B 75/04 |
| | | | 123/197.1 |
| 7,637,241 B2 * | 12/2009 | Styron | F02B 75/044 |
| | | | 123/193.6 |
| 2007/0234977 A1 | 10/2007 | Thorpe | |
| 2010/0192904 A1 * | 8/2010 | Tuncer | F01C 1/344 |
| | | | 123/234 |
| 2012/0227705 A1 | 9/2012 | Ashizawa | |
| 2013/0008395 A1 | 1/2013 | Keller | |
| 2013/0025571 A1 * | 1/2013 | Ashizawa | F01L 3/085 |
| | | | 123/48 R |
| 2014/0000548 A1 | 1/2014 | Bando | |
| 2015/0252750 A1 * | 9/2015 | Galvin | F02F 3/0015 |
| | | | 123/193.6 |

OTHER PUBLICATIONS

Wang, J., "Diesel Fuel Spray Measurement Using X-Rays," US Department of Energy—Office of Transportation Technologies, Combustion and Emission Control for Advanced CIDI Engines, FY 2001 Progress Report, Nov. 2001, 4 pages.

Assanis, D. et al., "Pressure Reactive Piston Technology Investigation and Development for Spark Ignition Engines," SAE International, SAE Technical Paper Series No. 2005-01-1648, 2005 SAE World Congress, Detroit, Michigan, Apr. 11, 2005, 16 pages.

* cited by examiner

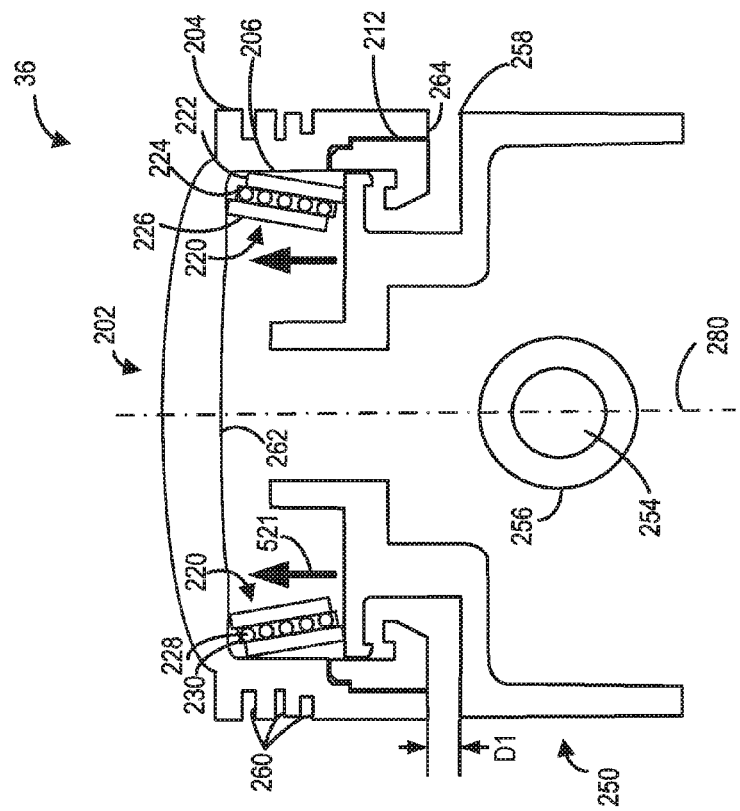
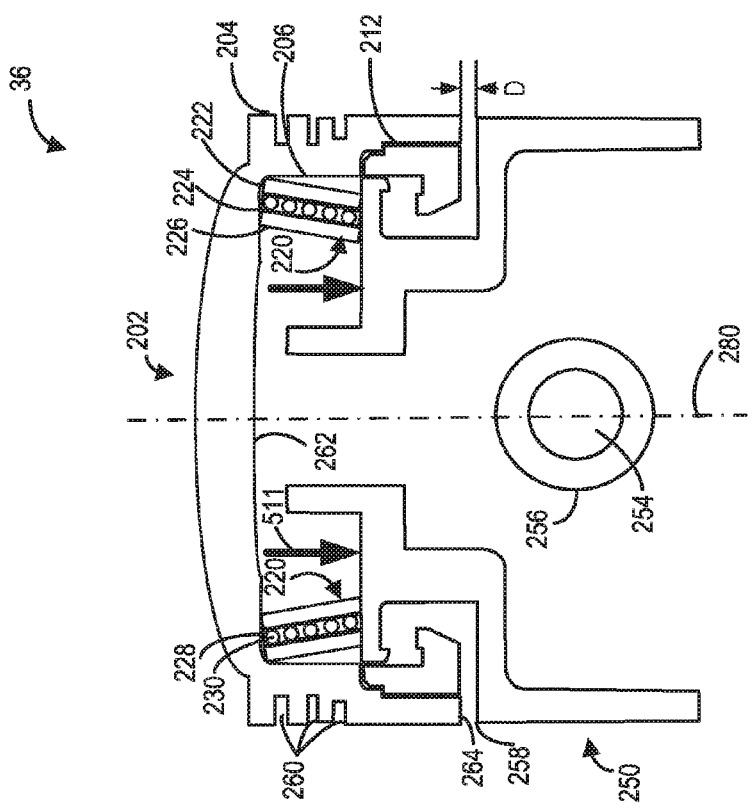

HOOP SPRING IN A PRESSURE REACTIVE PISTON

CROSS REFERENCE TO RELATED APPLICATION

The present application is a divisional of U.S. patent application Ser. No. 14/693,686, entitled "HOOP SPRING IN A PRESSURE REACTIVE PISTON," filed on Apr. 22, 2015. The entire contents of the above-referenced application are hereby incorporated by reference in its entirety for all purposes.

FIELD

The present disclosure relates to a spring positioned in a piston within an internal combustion engine.

BACKGROUND AND SUMMARY

A pressure reactive piston (PRP) situated in a cylinder of an engine may comprise a two-piece piston, wherein the two-piece piston includes a piston crown and a piston trunk. By integrating a separately actuated piston crown with a piston trunk, peak cylinder pressures may be reduced at higher loads without an additional control device. As such, the engine may operate at a higher compression ratio during lower load conditions, and may operate at a lower compression ratio during higher load conditions. Thus, peak temperatures and pressures within the combustion chamber may be reduced.

An example pressure reactive piston assembly is described by Brevick et al. in U.S. Pat. No. 5,755,192. Herein, the pressure reactive piston assembly includes a trunk portion, a crown portion slidably mounted upon the trunk portion, and a resilient element. The resilient element extends between an interior surface of the crown portion and an upper surface of the trunk portion and exerts a force to separate the crown portion from the trunk portion. In particular, the resilient element consists of four sets of Belleville springs.

The inventors herein have recognized potential issues with the approach identified above. The Belleville spring sets included in the pressure reactive piston assembly may have a higher mass than desired. Further, the Belleville springs may have an uneven stress distribution. Further still, Belleville springs may not deflect as desired during certain loads. Specifically, spring rates of Belleville springs may not be suitable for the desired application in a PRP. As a result, there may be an increased risk of knock and reduction in engine efficiency and fuel economy.

The inventors herein have recognized the above issues and developed an approach to at least partly address the above issues. In one example approach, a system is provided including a piston crown, and a spring positioned within the piston crown, the spring including a first ring, a second ring comprising a plurality of apertures, a rolling element positioned within each of the plurality of apertures, and a third ring, wherein the first ring, the second ring, and the third ring are arranged concentrically with the second ring positioned between the first ring and the third ring. In this way, a spring with lower mass may be used within a pressure reactive piston.

For example, an engine may include a cylinder with a pressure reactive piston. The pressure reactive piston may include two distinct pieces: a trunk portion and a crown portion, coupled to each other mechanically. Further, a hoop spring may be positioned within the crown portion of the piston and may rest atop the trunk portion of the piston. The hoop spring may include a first ring, a second ring, and a third ring arranged in a concentric manner. The second ring may include a plurality of apertures with each aperture including a rolling element. The first ring and the third ring may be made of steel, while the second ring may be made of a polymer material. As such, the engine may function with variable compression ratios as the crown portion of the piston slides over the trunk portion of the piston and compresses the hoop spring.

In this way, a hoop spring housed within a two-piece pressure reactive piston may provide variable compression ratio to the engine. By forming the spring of three distinct lightweight elements, a mass of the hoop spring may be reduced. The reduced mass of the hoop spring can lower the weight of the two-piece pressure reactive piston, improving engine performance. Moreover, the hoop spring may experience more uniform stress distribution, thereby increasing durability. Overall, engine efficiency may be improved while enhancing fuel economy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Finally, the above explanation does not admit any of the information or problems were well known.

BRIEF DESCRIPTION OF THE DRAWINGS

FIGS. 6A and 6B portray a schematic, cross-sectional view of the pressure reactive piston in a compressed state (FIG. 6A) and in an expanded state (FIG. 6B).

DETAILED DESCRIPTION

Figure 1:
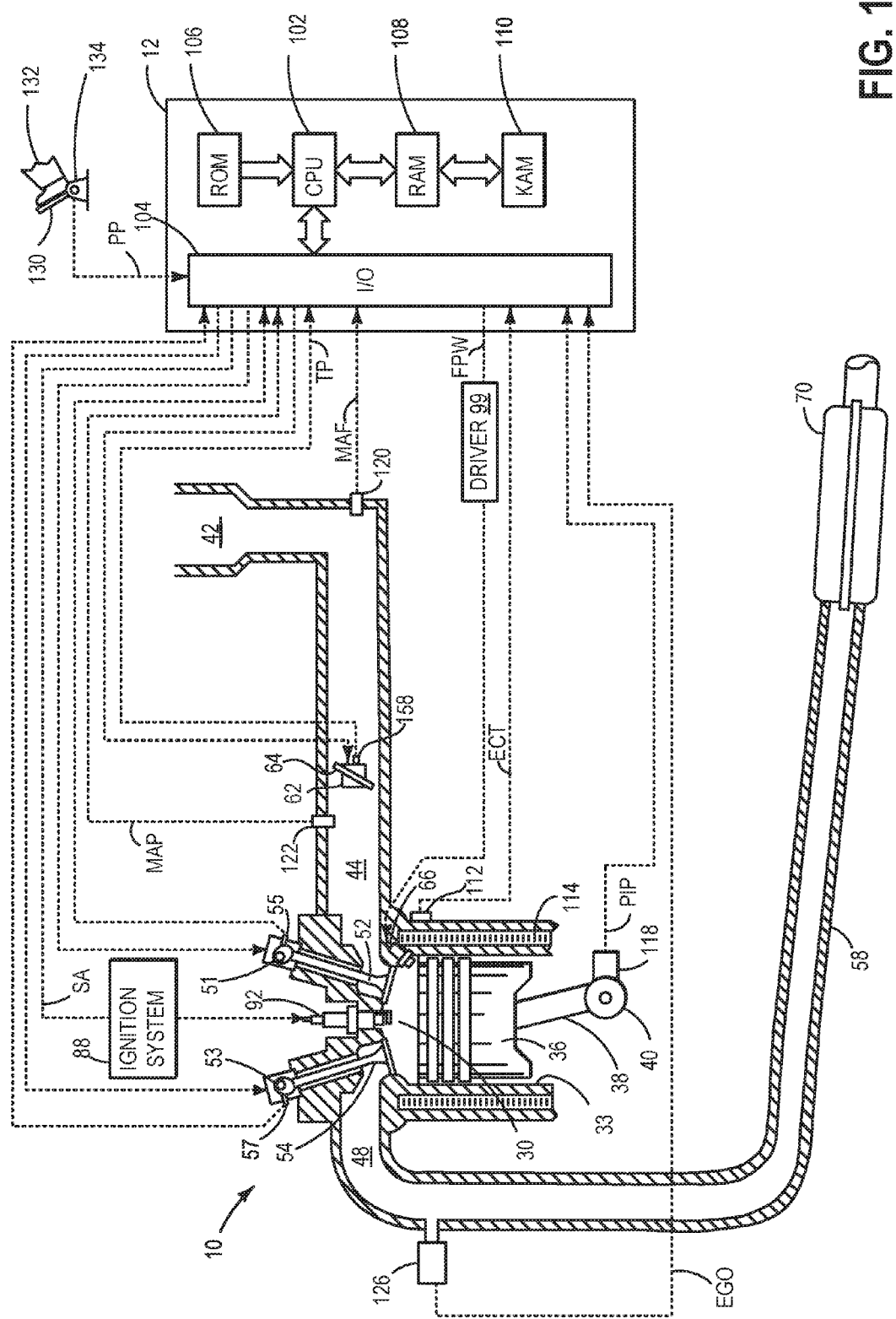
FIG. 1 shows a schematic diagram of an example engine.
Figure 2:
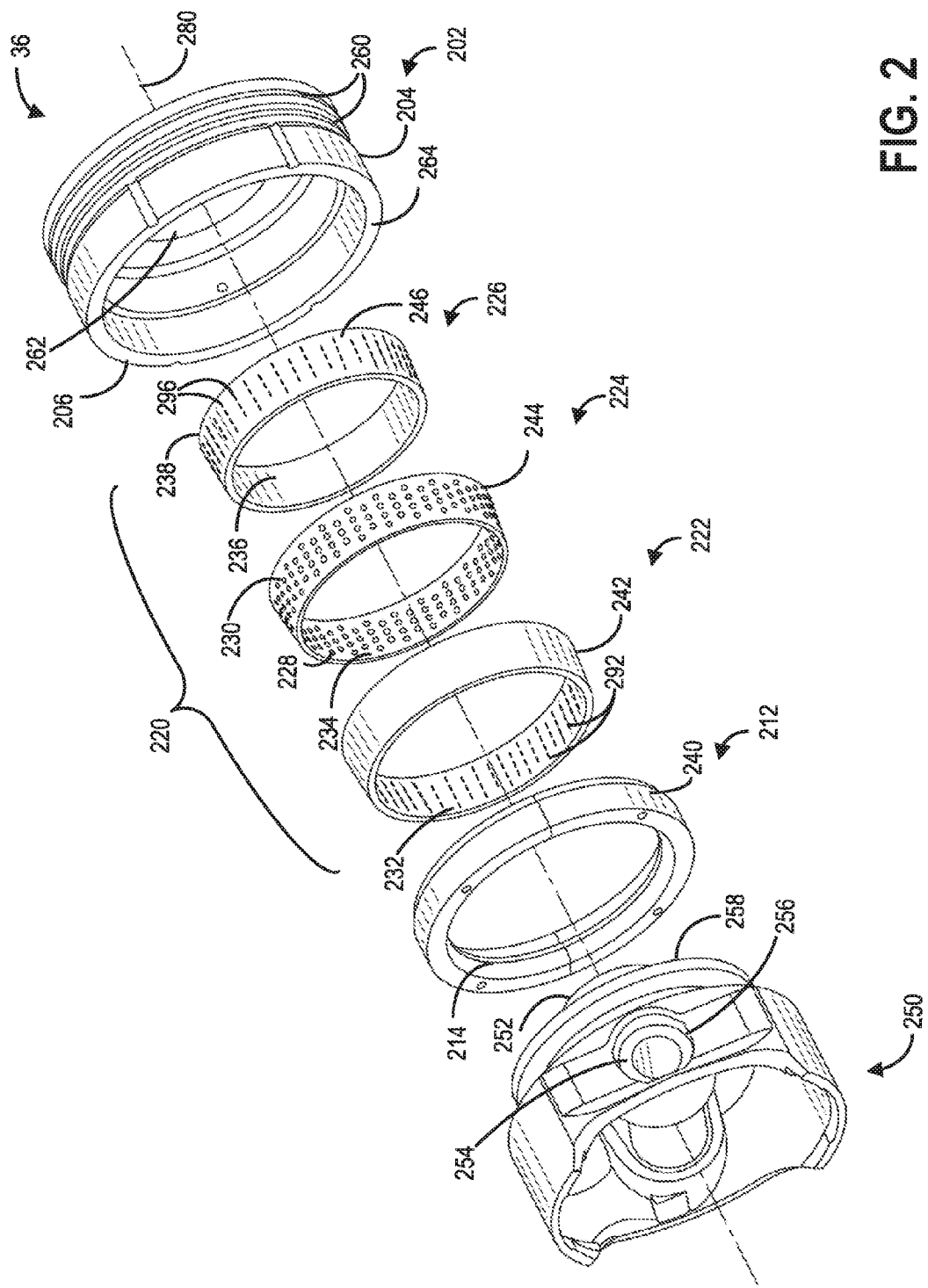
FIG. 2 depicts an exploded view of an example pressure reactive piston in an engine, such as the engine of FIG. 1.
Figure 3:
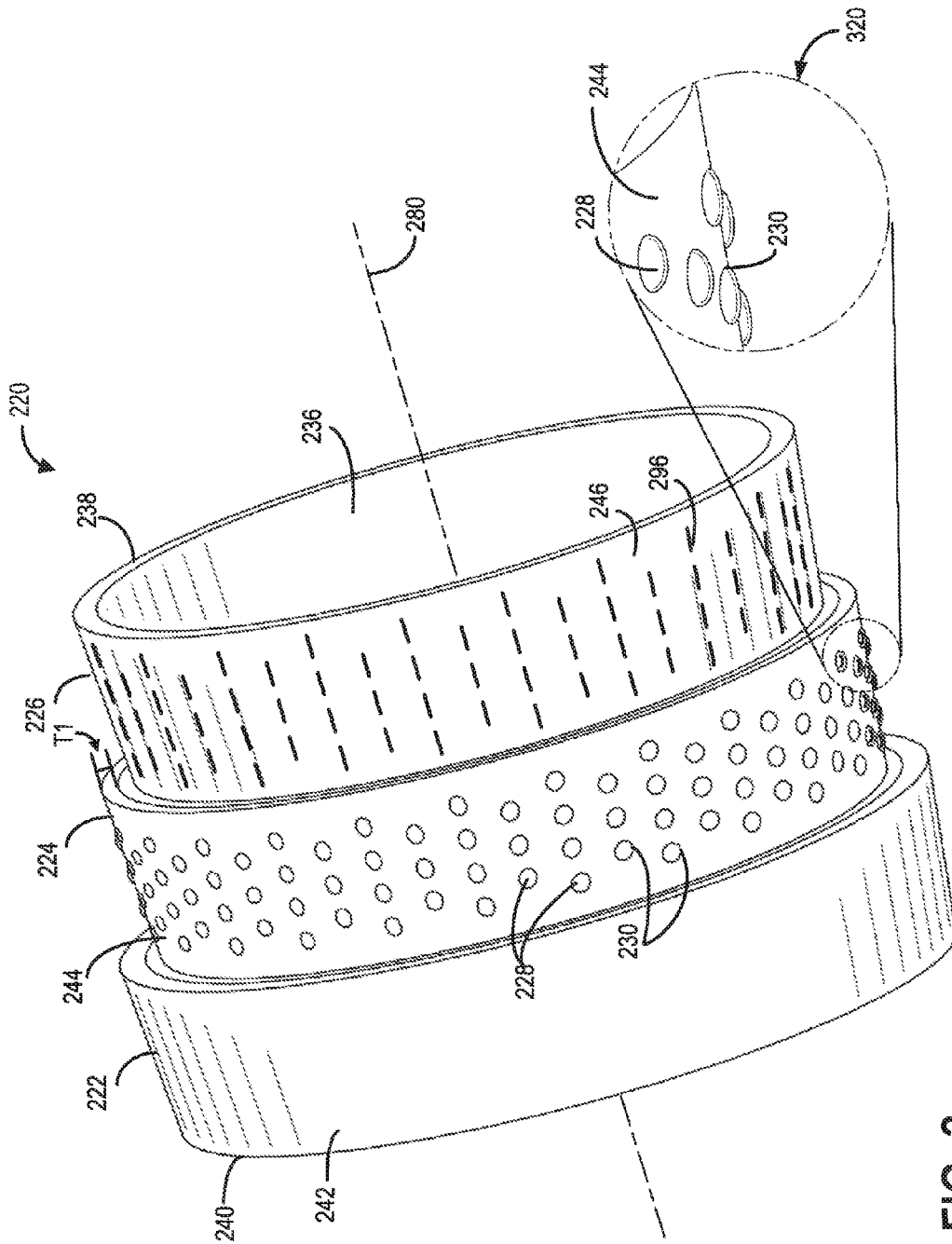
FIG. 3 illustrates an exploded view of an example hoop spring in the example pressure reactive piston of FIG. 2.
Figure 4:
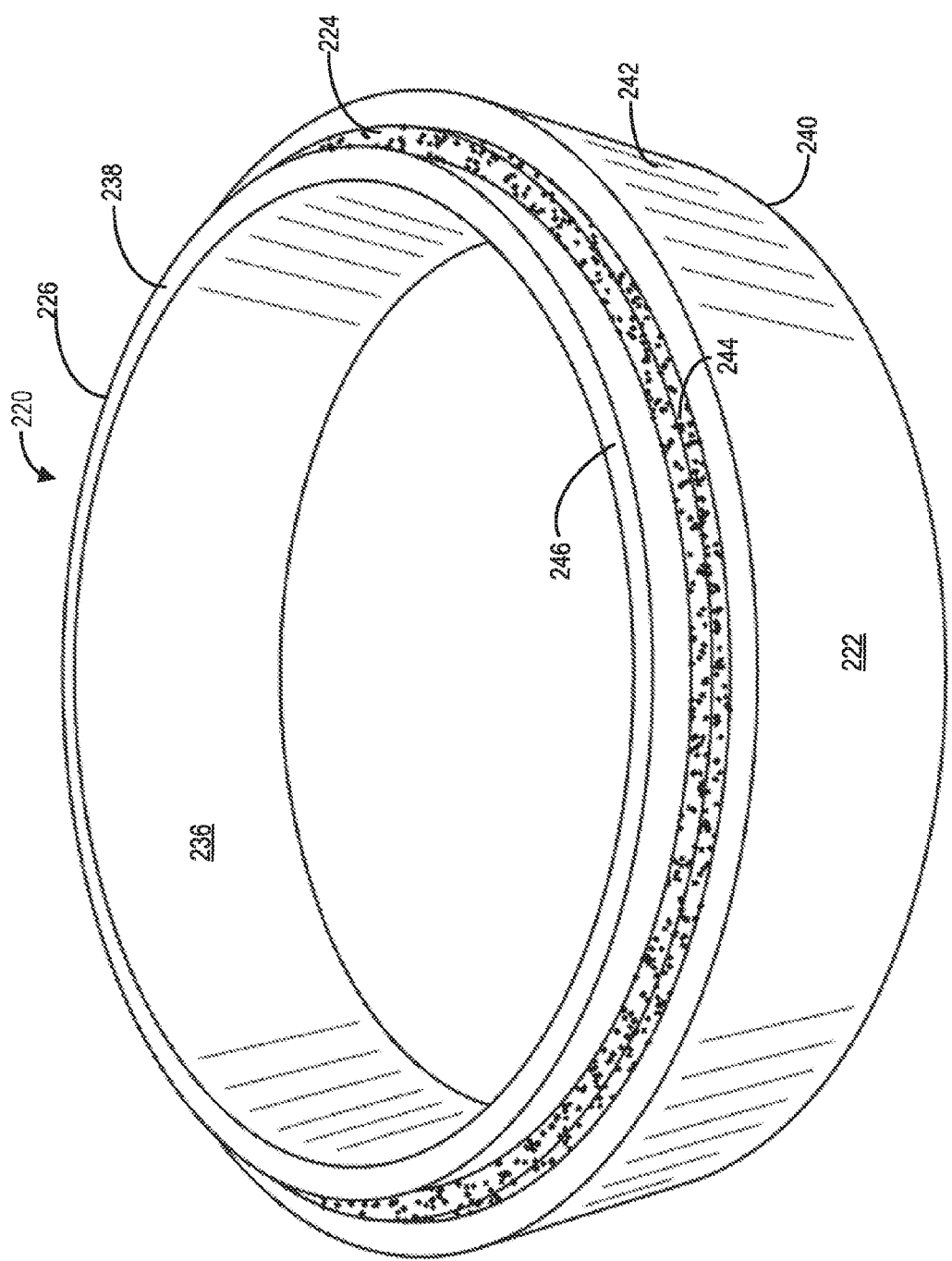
FIG. 4 is perspective view of the example hoop spring when fully assembled.

The following description relates to systems and methods for varying a compression ratio of an engine, such as the example engine depicted in FIG. 1. The compression ratio may be adjusted via including a spring assembly, or a hoop spring, within a two-piece piston, the two-piece piston having a trunk portion and a crown portion, as shown in FIG. 2. In particular, the hoop spring may include a first ring, a second ring, and a third ring, wherein the second ring may include a pluraltiy of rolling elements (FIG. 3). As such, the hoop spring may assembled together as shown in FIG. 4, and mounted on the trunk portion of the piston. Features of the hoop spring may be varied depending on desired spring rate and preload characteristics (FIGS. 5A-5D). In one embodiment, the hoop spring, may control the compression ratio by moving between a first state, or compressed position (FIG. 6A), and a second state, or expanded position (FIG. 6B). Further, spark timing may be adjusted based on the compression ratio of the engine, wherein the compression ratio is based on an age of the hoop spring within each cylinder of the engine, as shown in an example method of FIG. 6.

It will be noted that though the following description discusses the use of the hoop spring in a pressure reactive piston within a cylinder of an engine, the hoop spring may also be utilized in pumps and/or motors without departing from the scope of this disclosure.

Referring now to FIG. 1, a schematic diagram showing one cylinder of multi-cylinder engine 10, which may be included in a propulsion system of an automobile, is illustrated. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion chamber 30 (also termed, cylinder 30) of engine 10 may include combustion chamber walls 32 with piston 36 positioned therein. Piston 36 may be a pressure reactive piston comprising two sections: a crown and a trunk (not shown). A spring may be positioned within the piston to provide variation in compression ratio of engine 10, as will be described further in reference to FIGS. 2-5. Piston 36 may be coupled to crankshaft 40 via a connecting rod 38 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 99. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12. Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark. As such, in the compression ignition mode, homogeneous charge compression ignition (HCCI) or stratified charge combustion may be applied. Further, engine 10 may be a two-stroke engine in one example. However, engine 10 depicted in FIG. 1 may be a four-stroke engine.

Engine 10 may further include one or more pressure sensors (not shown) for sensing pressure in combustion chamber 30, and/or abnormal combustion events and differentiating abnormal combustion events due to knocking from those indicative of pre-ignition. For example, input from an in-cylinder pressure sensor may be used to estimate a compression ratio in the cylinder. As such, the pressure sensor may be an in-cylinder pressure transducer.

Exhaust gas sensor 126 (e.g., exhaust oxygen sensor) is shown coupled to exhaust passage 58 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In another embodiment, the engine may include an additional exhaust gas sensor so that the engine includes two exhaust gas sensors, both positioned upstream of the emission control device 70 (e.g., upstream of any and all catalysts in the engine system). For example, the exhaust gas sensor 126 may be the air/fuel ratio sensor while the second exhaust gas sensor may be an exhaust sensor dedicated for determining engine exhaust pressure and not for determining air/fuel ratio.

Emission control device 70 is shown arranged along exhaust passage 58 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Further, though now shown, an exhaust gas recirculation (EGR) system may route a desired portion of exhaust gas from exhaust passage 58 to intake manifold 44 via an EGR passage. The amount of EGR provided to intake manifold 44 may be varied by controller 12 via an EGR valve. Under some conditions, the EGR system may be used to regulate the temperature of the air and fuel mixture within the combustion chamber, thus providing a method of controlling the timing of ignition during some combustion modes.

Controller 12 is shown in FIG. 1 as a microcomputer, including microprocessor 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Further, controller 12 may estimate a compression ratio of the engine based on measurements from a pressure transducer positioned in the cylinder 30 (not shown).

The controller 12 receives signals from the various sensors of FIG. 1 and employs the various actuators of FIG. 1 to adjust engine operation based on the received signals and instructions stored on a memory of the controller.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own piston, set of intake/exhaust valves, fuel injector, spark plug, etc.

FIG. 2 illustrates an exploded view of a piston, such as piston 36 of FIG. 1, wherein the piston may be reciprocably mounted within an engine cylinder, such as cylinder 30 of engine 10, as shown in FIG. 1. FIG. 2 is drawn to scale, although other relative dimensions may be used. As mentioned earlier, piston 36 may be a pressure reactive piston (PRP) that reacts to pressure variations within its corresponding cylinder. Piston 36 may be a two-piece piston comprising a crown portion 202 (also termed piston crown 202) and a trunk portion 250 (also termed, piston trunk 250). Piston 36 may be coupled to a connecting rod (e.g. connecting rod 38 of FIG. 1) via piston trunk 250. As such, piston trunk 250 may be coupled (e.g. mechanically) to piston crown 202.

Further, a hoop spring 220 (also termed, spring 220) may rest atop the trunk portion 250. Specifically, spring 220 may rest on an upper portion of piston trunk 250, wherein the upper portion is closer to the piston crown 202 and away from connecting rod 38. Further still, hoop spring 220 may be fully enclosed within the crown portion 202. As such, each of the crown portion 202, the trunk portion 250, and the hoop spring 220 may have a common central axis 280. Alternatively, a central axis of the crown portion 202, a central axis of the trunk portion 250, and a central axis of the spring 220 may be parallel to each other. In the example of FIG. 2, the central axis of the crown portion 202, the central axis of the trunk portion 250, and the central axis of the spring 220 may be the same (e.g., central axis 280).

In the depicted embodiment, crown portion 202 comprises a cylindrical interior wall surface 206, a cylindrical exterior wall surface 204, a roof surface 262, and a lower rim 264, as shown in FIG. 2. Interior wall surface 206 and exterior wall surface 204 of crown portion 202 may each be parallel to each other and to a central axis 280. Roof surface 262 may be adjacent to and orthogonal relative to each of the interior wall surface 206 and exterior wall surface 204.

In addition, crown portion 202 may include a plurality of piston rings (not shown) mounted within a plurality of piston ring grooves 260, wherein the piston ring grooves 260 are arranged circumferentially along the exterior wall surface 204 of crown portion 202. In one example, there may be two piston ring grooves 260. In another example, there may be three piston ring grooves 260. In yet another example, piston 36 may include additional or fewer piston ring grooves. Under some conditions, mounting the plurality of piston rings circumferentially around crown portion 202 via the plurality of piston ring grooves 260 may promote efficient heat transfer from the piston to the cylinder wall and enable dynamic system damping. In one embodiment, crown portion 202 of piston 36 may be made from steel. In other embodiments, crown portion 202 may be made from another durable material able to withstand higher temperatures and resist deformation caused by thermal stress during engine cycles.

Piston 36 may be mechanically coupled to connecting rod 38 (shown in FIG. 1) via wrist pin 254, which is housed in wrist pin bore 256 of trunk portion 250 of piston 36. In the depicted embodiment, wrist pin 254 of piston 36 may be shorter in length than a wrist pin in a non-pressure reactive piston. For example, wrist pin 254 may be indented toward a center of the trunk portion 250 relative to an outer circumference of crown portion 202. The shortened length of wrist pin 254 may allow the crown portion 202 to slide over trunk portion 250 unimpeded by wrist pin 254.

Crown portion 202 of piston 36 may be slidably mounted upon trunk portion 250. Thus, crown portion 202 of piston 36 may slide over an edge of trunk portion 250. It will be appreciated that while crown portion 202 may slide and shift its position, the trunk portion 250 of piston 36 may not be capable of moving. As such, trunk portion 250 may be substantially fixed relative to the crown portion 202. The trunk portion 250 may include an upper rim 258 adjacent to a protuberance 252. In some examples, the lower rim 264 of the crown portion 202 may abut against, and directly contact, the upper rim 258 of the trunk portion 250, as shown below in FIG. 5A during one or more engine operating conditions, such as higher engine loads. In other examples, during lower engine loads, the lower rim 264 of the crown portion 202 may not abut against and may not directly contact the upper rim 258 of the trunk portion 250, as shown below in FIG. 5B.

Hoop spring 220 may be arranged atop the trunk portion 250. Specifically, hoop spring 220 may be positioned concentrically around protuberance 252 of trunk portion 250. Further, hoop spring 220 may be surrounded by the crown portion 202. As shown in the exploded perspective view of FIG. 2 and in FIG. 3, the hoop spring 220 comprises an outer first ring 222 (also termed, first ring 222), an intermediate second ring 224 (also termed, second ring 224), and an inner third ring 226 (also termed, third ring 226). Each of the first ring 222, second ring 224, and third ring 226 in the hoop spring 220 may be substantially cylindrical in shape. The first ring 222, second ring 224, and third ring 226 may be arranged in a concentric manner. To elaborate, a central axis of the first ring may be parallel to a central axis of the second ring. Further, the central axis of the second ring may be parallel to a central axis of the third ring. In the depicted example, the central axis of the first ring may be the same as the central axis of the second ring. Further still, the central axis of the second ring may be the same as the central axis of the third ring. Additionally, the central axes of each of the first ring, the second ring, and the third ring may be substantially parallel to, and the same as, central axis 280. Said another way, the central axis of the first ring coincides with each of the central axis of the second ring and the central axis of the third ring. Further, the central axes of the crown portion 202 and trunk portion 250 may each coincide with each of the central axis of the first ring 222, the central axis of the second ring 224, and the central axis of the third ring 226.

Thus, the third ring 226 may be nested in the second ring 224, and the second ring 224 may be nested in the first ring 222, as shown in FIG. 4. As such, the second ring may be positioned between the first ring and the third ring. In this way, the first ring 222 may be in direct contact with the second ring 224, and may not be in direct contact with the third ring 226, and the third ring 226 may be in direct contact with the second ring 224 but may not be in direct contact with the first ring 222.

Further still, each of the first ring 222, second ring 224, and third ring 226 in the hoop spring 220 may be tapered at an end of each ring proximal the trunk portion 250. To elaborate, each of the first ring 222, second ring 224, and third ring 226 may be tapered at an end that is away from (e.g., distal) crown portion 202. For example, an inner lateral surface 232 and outer lateral surface 242 of the first ring 222 may be angled towards the central axis of the first ring 222 (which may be the same as central axis 280). Similarly, an inner lateral surface 234 and outer lateral surface 244 of the second ring 224 may be angled towards the central axis of the second ring 224 which may be the same as central axis 280. Likewise, an inner lateral surface 236 and outer lateral surface 246 of the third ring 226 may be angled towards the central axis of the third ring 226 which may be the same as central axis 280.

It will be appreciated that each of the rings of hoop spring 220 may be tapered by the same amount. In other words, each of the inner lateral surfaces and each of the outer later surfaces of each of the rings may be angled substantially similarly relative to central axis 280 allowing the third ring to be surrounded by the second ring, and for the first ring to encompass the second ring.

In an alternative embodiment, each of the first ring 222, second ring 224, and third ring 226 may be tapered, or angled, toward the central axis 280 at an end proximal crown portion 202 (and away from trunk portion 250).

In one example, the inner lateral surface 232 and outer lateral surface 242 of the first ring 222 may be angled 5 degrees relative to the central axis 280 at an end proximal the trunk portion 250. In another example, inner lateral surface 234 and outer lateral surface 244 of the second ring 224 may be similarly angled 5 degrees relative to the central axis 280 at an end proximal the trunk portion 250. In yet another example, inner lateral surface 236 and outer lateral surface 246 of the third ring 226 may be angled 5 degrees relative to the central axis 280 at an end proximal the trunk portion 250. In one embodiment, each of the inner lateral surface and outer later surface of each of the first ring 222, second ring 224, and third ring 226 may be angled 10 degrees relative to the central axis 280 at an end proximal trunk portion 250. In another one embodiment, each of the inner lateral surface and outer later surface of each of the first ring 222, second ring 224, and third ring 226 may be angled at any degree between 5 and 10 degrees relative to the central axis 280 at an end proximal trunk portion 250. Alternatively, each of the inner lateral surface and outer lateral surface of each of the first ring 222, second ring 224, and third ring 226 may be angled as described above relative to the central axis 280 at an end proximal crown portion 202.

As shown in FIG. 2 (and in FIG. 3), a circumference of the second ring 224 comprises one or more apertures 228, wherein each of the apertures 228 retains a rolling element 230. On the other hand, a circumference of the first ring 222 and a circumference of the third ring 226 do not include a plurality of apertures 228 and/or rolling elements 230. In one example, the rolling element 230 may be a ball. As such, the rolling elements may be spheres formed with precise design parameters. For example, each of the rolling elements 230 may be 2 millimeters in diameter. In another example, the diameter of each rolling element may be 3 millimeters. In another example, the rolling element 230 may be a cylindrical rolling element. The size of the apertures 228 may be based on the size of the rolling elements. In one example, each of the rolling elements 230 may be made of steel. In another example, the rolling elements may be formed from plastic. In yet another example, material used to form the rolling elements may be a ceramic.

It will be noted that the circumference of the second ring may include a plurality of apertures, each of the plurality of apertures accommodating a single rolling element. In one example, the second ring may include 100 apertures. In another example, the number of apertures, and therefore, number of rolling elements, may be 150. In yet another example, the hoop spring may include 200 rolling elements situated in 200 apertures on the second ring. In one embodiment, the first ring 222 and third ring 226 may each be made of steel, while the second ring 224 may be composed of a polymer, such as nylon. Further, the first ring 222 and the third ring 226 may be hardened by heat treatment. In another embodiment, the first ring 222 and third ring 226 may each be made of another metal, such as aluminum, titanium, and/or a metal alloy such as bronze. Alternatively, the hoop spring may be formed of a composite material. Combinations of the above may also be possible. For example, the third cylinder may be made of aluminum while the first cylinder is made of steel. In another example, the third cylinder may be made of bronze while the first cylinder is made of aluminum.

As shown in FIG. 2, the outer lateral surface 246 (also termed, outer circumference region 246) of the third ring 226 may include a plurality of axial grooves 296. Likewise, the inner lateral surface 232 (also termed, inner circumference region 232) of the first ring 222 may comprise a plurality of axial grooves 292. Each axial groove may be in face-sharing contact with a corresponding rolling element 230 on the second ring 224. As such, each rolling element 230 may be in face-sharing contact with two axial grooves: a first axial groove on outer lateral surface 246 of third ring 226 and a second axial groove on inner lateral surface of first ring 222. Further, each rolling element 230 may be in face-sharing contact with the two axial grooves at the same time.

Each rolling element 230 retained in apertures of the second ring 224 may slide along each of a corresponding first axial groove and a corresponding second axial groove. Each first axial groove (e.g., 296) and second axial groove (e.g., 292) may be complementary but may not be in face-sharing contact with each other when the hoop spring 220 is assembled. Each axial groove may allow controlled rolling of the second ring 222 against the inner lateral surface 232 of the first ring 222 and the outer lateral surface 246 of the third ring 226 by enabling line contact and/or less unit loading. As such, the number of axial grooves 296 on the outer circumference region 246 of third ring 226 and number of the axial grooves 292 on the inner circumference region 232 of the first ring 222 may be the same as the total number of rolling elements 230 of the second ring 224.

The depth of each of the axial grooves 292 and axial grooves 296 may be based on the diameter of the rolling elements 230. For example, if the rolling elements are each 2 mm in diameter, each of the axial grooves 292 and each of axial grooves 296 may be 1 mm deep into the first ring 222 and the third ring 226, respectively. Further, in another example, each of axial grooves 292 may be the same length as each of axial grooves 296 along central axis 280. In one example, each axial groove 292 and axial groove 296 may be 3 mm in length along central axis 280. In another example, each axial groove 292 and axial groove 296 may be 4 mm in length along central axis 280.

In another embodiment, axial grooves 292 on the inner lateral surface 232 of the first ring 222 and axial grooves 296 on the outer lateral surface 246 of the third ring 226 may not be provided.

An alternative embodiment of a hoop spring may include cylindrical rolling elements instead of spherical rolling elements, as described above. In this alternative embodiment a flat indentation (not shown in Figures) may be provided for each cylindrical rolling element on the second ring 224. Further, a plurality of flat indentations may be formed on the inner lateral surface 232 of the first ring 222 and/or on the outer lateral surface 246 of the third ring 226. The number of flat indentations on the inner lateral surface 232 of the first ring 222 may be the same as a number of cylindrical rolling elements on the second ring 224. Similarly, the number of flat indentations on the outer lateral surface 246 of the third ring 226 may be the same as a number of cylindrical rolling elements on the second ring 224.

Each of the flat indentations may allow controlled rolling of the second ring 224 against the inner lateral surface 232 of the first ring 222 and the outer lateral surface 246 of the third ring 226 by enabling line contact and/or lesser unit loading. In one example, each cylindrical element retained in the second ring 224 may slide along its complementary and face-sharing flat indentation on each of the third ring 226 and first ring 222 when the hoop spring 220 is assembled.

It will be appreciated that various dimensions of the components of the hoop spring 220 may be varied without departing from the scope of this disclosure. Further, the coefficient of friction may be varied to enable smoother movement of the elements of the hoop spring.

It will also be noted that hoop spring 220 may be preloaded. The preload on the hoop spring may be such that deflection or displacement of the spring via compression may occur only at loads higher than the preload. The preload on the hoop spring 220 may reduce relative movement between the upper crown portion 202 and lower trunk portion 250 of piston 36 until cylinder pressure exceeds the preload on the hoop spring. In one example, the preload on hoop spring 220 may be approximately 2000 lbs (or 8.9 kN). In another example, the preload on hoop spring 220 may be 2500 lbs (or 11 kN).

In one embodiment, hoop spring 220 may be axially loaded by crown portion 202 when cylinder pressure exceeds the preload on the hoop spring 220. Herein, the third ring 226 may slide against and past the plurality of rolling elements 230 retained in the apertures 228 of the second ring 224. As such, the third ring 226 may move towards the second ring 224. Specifically, the outer lateral surface 246 of the third ring 226 may slide on the inner lateral surface 234 of second ring 224. Concomitantly, the second ring 224 may slide against the inner lateral surface 232 of the first ring 222 enabled by the plurality of rolling elements 230 of second ring 224. As such, each of the second ring 224 and third ring 226 may slide in a first direction. In one example, the first direction is a downward direction towards the trunk portion 250 and the wrist pin 254.

Thus, when cylinder pressure exceeds the preload on the hoop spring 220, the crown portion 202 of piston 36 slides towards trunk portion 250. To elaborate, crown portion 202 exerts a force on upper rim 238 of the hoop spring 220 that exceeds the preload on spring 220 causing compression of the hoop spring. The compression of the hoop spring may be referred to as the spring being in a compressed position or state. Compression of the hoop spring may be a function of a spring rate (or spring constant) of the spring.

As such, the third ring 226 may be pressed into each of the second ring 224 and first ring 222, the third ring 226 sliding on the rolling elements 230 positioned in the plurality of apertures 228 in the second ring 224 as a distance between the crown of the piston and the piston trunk decreases. In this way, the third ring 226 (also termed, third annular element), may be fitted more tightly within the second ring 224 (also termed, second annular element). Further, the first ring 222 (also termed, first annular element), may enclose second ring 224 more snugly. In this compressed state, the third ring 226 may experience compression while the first ring 222 may experience tension.

When the cylinder pressure reduces to below the preload of the hoop spring 220, the third ring 226 may slide against and past the plurality of rolling elements 230 retained in apertures 228 of second ring 224 and may expand away from the second ring 224. Specifically, outer lateral surface 246 of third ring 226 may slide along the inner lateral surface 234 of second ring 224. Concomitantly, the plurality of rolling elements 230 of second ring 224 may slide against the inner lateral surface 236 of the first ring 222, each of the second ring 224 and third ring 226 sliding in a second direction. In one example, the second direction is an upward direction away from trunk portion 250 towards crown portion 202 of the piston 36. Further, each of the first ring, the second ring, and the third ring may resume their positions relative to each other and the crown portion 202.

As such, when cylinder pressure is lower than the preload on hoop spring 220, the crown portion 202 of piston 36 may not exert a force on the upper rim 238 of the hoop spring 220. Herein, the hoop spring may be in a released position (also termed, expanded state). In this released position, the third ring 226 may be fitted less forcefully within the second ring 224 relative to when hoop spring 220 is in the compressed position. Further, the first ring 222 may enclose each of the second ring 224 and third ring 226 in a less constricted manner relative to that in the compressed position of the hoop spring.

A retainer ring 212 may be provided to couple the crown portion 202 to the trunk portion 250. The retainer ring 212 may have a thread, or an interior ledge 214, to which crown portion 202 may be mechanically coupled. As such, the retainer ring 212 may allow stable assembly of the crown portion 202 to the trunk portion 250, thereby enabling the desired preload of hoop spring 220. In an example, the retainer ring 212 may be a split ring. The retainer ring 212 may be cylindrical in shape and may have a distinct width relative to the widths of each of the first ring, the second ring, and the third ring of the hoop spring. As such, the retainer ring 212 may not be tapered. In the depicted embodiment, the retainer ring 212 may not couple to and may not directly contact the hoop spring 220, as to not impede or disrupt the sliding of the hoop spring 220 in the first and/or second direction. The depicted retainer ring 212 may be threaded to enable assembly of the piston crown 202 to the piston trunk 250. In an alternative embodiment, the retainer ring may be furnace brazed to the piston crown after assembly.

In another embodiment, hoop spring 220 may rest directly upon upper rim 258 of the trunk portion 250. Herein the retainer ring 212 may circumferentially surround and enclose the third ring 226 around its outer lateral surface 242 in order to reduce lateral motion of hoop spring 220. In yet another embodiment, a retainer ring may not be provided. Additional components may be used to arrange the hoop spring 220 within the crown portion 202 and/or on top of the trunk portion 250 without departing from the scope of this disclosure. Further, the crown portion 202 of piston 36 may be coupled to the trunk portion 250 of piston 36 via one or more methods known in the art to achieve stability to the piston 36.

In this way, a system may be provided, comprising a piston crown, and a spring positioned within the piston crown, the spring including a first ring, a second ring comprising a plurality of apertures, a rolling element positioned with each of the plurality of apertures, and a third ring, wherein the first ring, the second ring, and the third ring are arranged concentrically with the second ring positioned between the first ring and the third ring. In addition, a piston trunk may be coupled to the piston crown, and the spring may be positioned on a top of the piston trunk. As such, the piston trunk and the piston crown form a piston of a cylinder within an engine, and the piston trunk may be coupled to a connecting rod. By providing the spring between the piston crown and piston trunk, the piston crown may be movable relative to the piston trunk, while piston trunk may be fixed relative to the piston crown.

The first ring may be in direct contact with the second ring, and may not be in direct contact with the third ring and wherein, the third ring may be in direct contact with the second ring but may not be in direct contact with the first ring. Further, a central axis of the first ring may be parallel to each of a central axis of the second ring and a central axis of the third ring. Similarly, a central axis of the piston crown may coincide with each of the central axis of the first ring, the central axis of the second ring, and the central axis of the third ring. The first ring, the second ring, and the third ring may be shaped as tapered cylinders. In one embodiment, the first ring and the third ring may be made of steel, and the second ring may be made of a polymer.

Turning now to FIG. 3, it is an exploded view of hoop spring 220 illustrating each of the first ring 222, second ring 224, and third ring 226 of the hoop spring, as described above in reference to FIG. 2. FIG. 3 also includes a magnified view 300, indicated by a circled dash-dot line, of the plurality of apertures 228 on the circumference of second ring 224. As shown in magnified view 300, each aperture 228 retains rolling element 230. In one embodiment, each of the rolling elements 230 may be substantially spherical in shape. Further, each of the rolling elements may rotate about a single axis. In one example, the single axis may be substantially orthogonal, or perpendicular to, the central axis 280. As such, substantially all the rolling elements 230 may rotate about the same single axis.

Each rolling element 230 may have a diameter substantially similar to a thickness, denoted herein as T1, of the second ring 224. For example, each rolling element 230 in the plurality of apertures 228 of second ring 224 may directly contact the inner lateral surface 232 of the first ring 222. At the same time, each rolling element 230 may also be in face sharing (or direct) contact with the outer lateral surface 246 of the third ring 226. In this way, the rolling elements 230 may allow the second ring 224 to slide past the inner lateral surface 232 of the first ring 222. Similarly, the outer lateral surface 246 of the third ring 226 may slide against the rolling elements 230 in the second ring 224.

In one example, e.g., when spring 220 is compressed, each of the second ring 224 and third ring 226 may slide in the first direction (e.g., downward) into the first ring 222 toward trunk portion 250, as will be described below in reference to FIG. 5A. In another example, e.g., when spring 220 expands, each of the second ring 224 and third ring 226 may slide in the second direction (e.g., upward) from the first ring 222 toward piston crown 202, as will be described below in reference to FIG. 5B. As such, the hoop spring 220 may be compressed (and may also be released) in an axial direction parallel to central axis 280. Further, axial travel of the entire hoop spring when under compression may be a specifically designed parameter. In one example, the hoop spring may be designed to have an axial travel distance of 3 mm. In another example, the axial travel for the hoop spring may be 4 mm. In yet another example, the axial travel for the hoop spring may be a distance between 3 and 4 mm.

Thus, the hoop spring 220 described in FIGS. 2-3 may enable a method comprising, responsive to pressure in a cylinder of an engine exceeding a threshold, displacing a crown of a piston toward a trunk of the piston, the piston reciprocating within the cylinder, and compressing a third ring of a spring into each of a second ring and a first ring of the spring, the third ring sliding past a plurality of rolling elements included within a plurality of apertures in the second ring of the spring, wherein the second ring is positioned between the first ring and the third ring. The threshold may be a preload on the spring positioned in the piston. The pressure in the cylinder of the engine may exceed the threshold during a power stroke in the cylinder. Specifically, the pressure in the cylinder of the engine may exceed the threshold during the power stroke of the engine in a range between 10 to 20 degrees after the piston reaches top-dead-center (TDC) position in the corresponding cylinder. In one example, pressure in the cylinder may exceed the preload of the hoop spring approximately 10 degrees after TDC position of the corresponding piston in the power stroke. In another example, cylinder pressure may increase to higher than the threshold at about 20 degrees after TDC position of the piston in the power stroke. The method may further include responsive to pressure in the cylinder of the engine decreasing below the threshold, releasing the third ring of the spring from each of the second ring and first ring of the spring, and displacing the crown of the piston away from the trunk of the piston. The pressure in the cylinder may decrease below the threshold during an exhaust stroke in the cylinder subsequent to the power stroke.

In one embodiment, the third ring may be nested within the second ring, and the second ring may be nested within the first ring, such that a central axis of the first ring is aligned with each of a central axis of the second ring and a central axis of the third ring. Further, each of the first ring, second ring, and third ring may be shaped as tapered cylinders. The spring may be substantially enclosed within the crown, and the spring may be positioned on top of the trunk of the piston.

FIG. 4 illustrates a perspective view of the hoop spring 220 as observed from a top of the hoop spring. The hoop spring, herein also referred to as a spring assembly, includes the outer first ring 222, intermediate second ring 224 (shown here as a dotted surface), and inner third ring 226. FIG. 4 illustrates the first ring 222, the second ring 224, and the third ring 226 assembled together to form hoop spring 220. Specifically, the hoop spring 220 may be placed, as assembled, within piston 36.

In one embodiment, third ring 226 may have a smaller diameter than the second ring 224, and the second ring 224 may have a smaller diameter than the first ring 222. As such, the third ring 226 may have a smaller diameter relative to the diameters of each of first ring 222 and second ring 224. To elaborate, an outer diameter and an inner diameter of the third ring may be smaller than an outer diameter and an inner diameter of the first ring, respectively. Accordingly, the third ring 226 may be nested in the second ring 224, and the second ring 224, having the third ring 226 concentrically mounted therein, may be nested in the first ring 222. Thus, each of the first ring 222, second ring 224, and third ring 226 may share the same central axis 280 (as shown in FIGS. 2 and 3).

It will be appreciated that the diameters of each ring of the hoop spring may be varied. As described earlier, each of the rings of the hoop spring may be tapered at one end. For example, each of the first ring, the second ring, and the third ring may be angled at 5 degrees per side (or a total of 10 degrees) relative to the central axis 280. In another example, each of the first ring, the second ring, and the third ring may be tapered at 7 degrees per side relative to the central axis 280. As discussed above in reference to FIG. 2, each of the inner lateral surface and outer lateral surface of each of the first ring 222, second ring 224, and third ring 226 may be angled relative to the central axis 280 at an end proximal trunk portion 250. In alternative embodiments, each of the inner lateral surface and outer lateral surface of each of the first ring 222, second ring 224, and third ring 226 may be angled relative to the central axis 280 at an end proximal crown portion 202. Thus, the end of each ring of the hoop spring closer to the piston crown may be tapered. Further still, a height of each ring of the hoop spring may be substantially similar. The height of each ring of the hoop spring may depend on the height of the crown portion 202 of the piston 36. In one example, each ring of the hoop spring may be 15 mm in height. In another example, each ring of the hoop spring may be 20 mm in height. It will be noted that the heights of each ring may be different than the examples provided above without departing from the scope of this disclosure. Likewise, a thickness of each ring of the hoop spring may be substantially similar. The dimensions of the rings of the hoop spring may also affect the weight (or mass) of the hoop spring. As such, the weight (or mass) of the hoop spring 220 may be reduced by selecting specific dimensions of the hoop spring. Further still, by using a polymer material for at least the second ring of the hoop spring, the weight (or mass) of the hoop spring 220 may be further diminished.

Turning now to FIGS. 5A-5D, cross-sectional views of alternative embodiments of the hoop spring are depicted. The hoop springs in FIGS. 5A-5D may be different arrangements of an example hoop spring, such as hoop spring 220. Further, the cross-sectional views of the hoop springs are schematic. As such, designing and forming a hoop spring may comprise modifying one or more of multiple variables including material, coefficient of friction, a profile of the hoop spring, as well as a cross section of the hoop spring. Each of FIGS. 5A, 5B, 5C, and 5D depict two positions of the depicted hoop spring: a compressed state and a more relaxed state. The compresses state of the example hoop springs may occur when cylinder pressure exceeds a preload of the example hoop spring of each of these embodiments. As explained earlier, in response to cylinder pressure being greater than the preload of the hoop spring, the piston crown may move towards the piston trunk causing compression of the hoop spring located within the piston crown. When cylinder pressure is lower than the preload of the hoop spring (e.g., in an exhaust stroke subsequent to a prior power stroke), the distinct rings of the hoop spring may expand, and release, away from each other. As such, the hoop spring may be in the expanded state (or relaxed state) in response to the cylinder pressure being lower than the preload of the hoop spring.

Figures 5A, 5B:
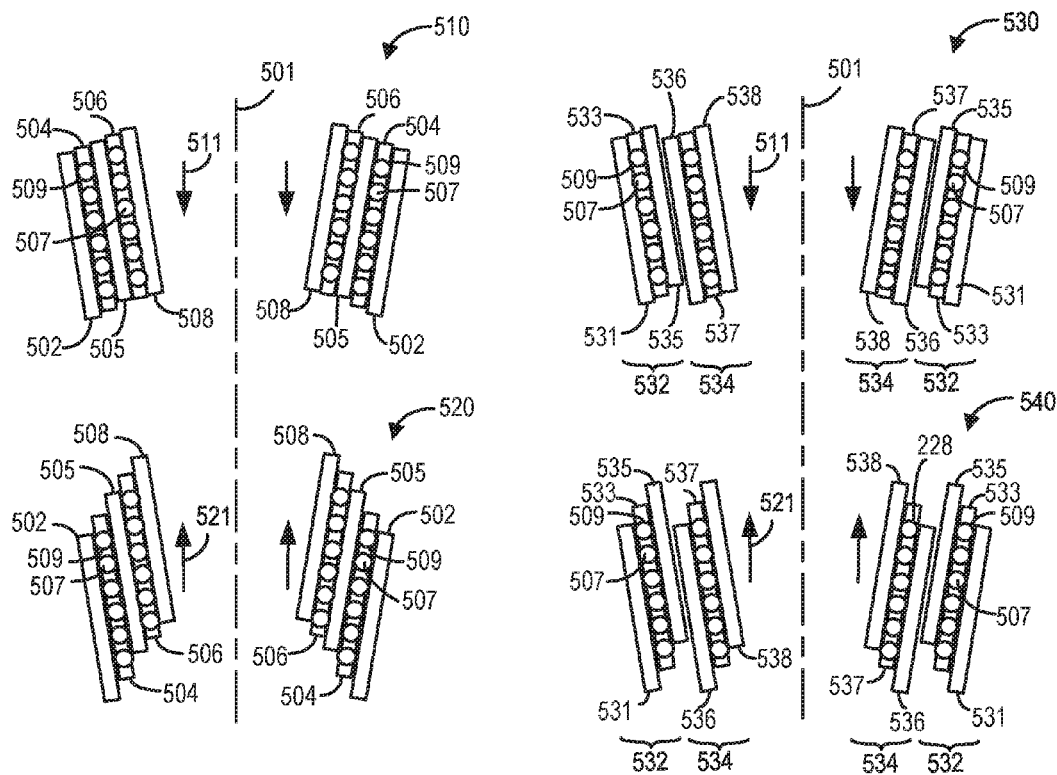
FIGS. 5A, 5B, 5C, and 5D, show schematic, cross-sectional views of alternative embodiments of the example hoop spring in the example reactive piston of FIG. 2.

In FIG. 5A, an example hoop spring having a nested configuration is depicted. Herein, the example hoop spring includes five rings: first ring 502, second ring 504, third ring 505, fourth ring 506, and fifth ring 508. Each of the five rings may be nested together and positioned concentrically (in relation to central axis 501) as shown. Specifically, first ring 502 is positioned at the exterior (e.g., outermost of the five rings) of the embodiment, and substantially surrounds the remaining four rings. The fifth ring 508 is the innermost ring of the five rings and is substantially surrounded by fourth ring 506. Further, third ring 505 may be positioned in the middle substantially surrounded by second ring 504. Further still, third ring 505 substantially encloses fourth ring 506.

As depicted, each of second ring 504 and fourth ring 506 include a plurality of apertures, each aperture 509 including a rolling element 507. Thus, both second ring 504 and fourth ring 506 have a plurality of rolling elements 507 included along their respective circumferences. Further, each of first ring 502, third ring 505, and fifth ring 508 may not include any apertures on their circumference. Further still, none of the first ring 502, third ring 505, and fifth ring 508 include any rolling elements. As such, the spring embodiment depicted in FIG. 5A includes two rings with rolling elements and three rings without rolling elements.

In one example, the third ring 505 may be cylindrical in shape, and may have a diameter between each of the diameter of the first ring 502 and fifth ring 508. In other words, the diameter of third ring 505 may be greater than that of fifth ring 508 and at the same time, the diameter of the third ring 505 may be smaller than the diameter of the first ring 502. In this example, the fourth ring 506 may have a diameter between each of the diameter of the third ring 505 and the diameter of the fifth ring 508.

First image 510 of FIG. 5A shows the example hoop spring in a compressed state. Herein, a downward force (e.g., cylinder pressure) may be exerted on the hoop spring in the first direction, denoted herein as first arrows 511. The downward force exerted in the first direction may compress fifth ring 508 into each of the fourth ring 506, third ring 505, the second ring 504, and the first ring 502 when the downward force exceeds the preload of the hoop spring of FIG. 5A. Further still, the third ring 505 may also be pressed into first ring 502. The compression of the hoop spring of FIG. 5A occurs due to fifth ring 508 sliding on the plurality of rolling elements 507 in fourth ring 506 in the first direction denoted by first arrows 511. Compression of the hoop spring of FIG. 5A may be further enabled by the third ring 505 sliding past the plurality of rolling elements in second ring 504 in the first direction as denoted by first arrows 511. As such, first arrows 511 indicate a downward motion. To elaborate, the downward direction may be with respect to the piston crown sliding towards the piston trunk of piston 36 of FIG. 2.

Second image 520 depicts the example hoop spring of FIG. 5A in an expanded state. When the downward force (e.g., cylinder pressure) does not exceed the preload of the hoop spring, fifth ring 508 may be released from each of the fourth ring 506, third ring 505, the second ring 504, and the first ring 502 in the second direction, denoted herein as second arrows 521. Specifically, cylinder pressure may be lower than the preload on the hoop spring of FIG. 5A enabling an expansion of the five rings of the hoop spring of FIG. 5A. The expansion of the hoop spring of FIG. 5A occurs due to fifth ring 508 sliding on the plurality of rolling elements 507 in fourth ring 506 in the second direction denoted by second arrows 521. Expansion of the hoop spring of FIG. 5A may be further enabled by the third ring 505 sliding past the plurality of rolling elements in second ring 504 in the second direction as denoted by second arrows 521.

In FIG. 5B, a distinct embodiment of another example hoop spring comprising a first set of springs 532 and a second set of springs 534 is shown. Herein, each of the first set of springs 532 and the second set of springs 534 may comprise three rings arranged concentrically. The first set of springs 532 includes first ring 531, second ring 533, and third ring 535. Further, the second set of springs 534 includes first ring 536, second ring 537, and third ring 538.

In this embodiment of FIG. 5B, the second set of springs 534 may be concentrically arranged within the first set of springs 532 relative to central axis 501. Thus, first ring 531 of the first set of springs 532 may be larger (e.g., have a greater diameter) than the first ring 536 of the second set of springs 534. Similarly, second ring 533 of the first set of springs 532 may be larger (e.g., have a larger diameter) than the second ring 537 of the second set of springs 534. Likewise, third ring 535 of the first set of springs 532 may be larger than the third ring 538 of the second set of springs 534. In other words, the first set of springs 532 may be arranged to enclose the second set of springs 534. As such, each of the first set of springs 532 and second set of springs 534 may be arranged similarly to hoop spring 220 of FIGS. 2, 3, and 4. Thus, each of the second rings (e.g., 533 and 537, respectively) of the first set of springs 532 and second set of springs 534 may include a plurality of apertures with each aperture 509 retaining a rolling element 507 within. Furthermore, each of the first rings and the third rings of the first set of springs and the second set of springs may not include apertures on their respective circumferences, and therefore, may not feature any rolling elements. Further still, each of the first set of springs 532 and second set of springs 534 may function similarly to hoop spring 220 of FIGS. 2, 3, and 4.

First image 530 of FIG. 5B depicts the hoop spring of FIG. 5B in a compressed state. Herein, a downward force may be exerted on the hoop spring of FIG. 5B in the first direction (as shown by first arrows 511). When the downward force (e.g., cylinder pressure) is greater than the preload of the hoop spring of FIG. 5B, third ring 538 may be compressed into each of second ring 537 and first ring 536 of the second set of springs 534. Thus, the third ring 538 may slide on the plurality of rolling elements of second ring 537. Simultaneously, the downward force may press third ring 535 into each of second ring 533 and first ring 531 of the first set of springs 532.

Second image 540 depicts the example hoop spring of FIG. 5B in an expanded state. Herein, the downward force (e.g., cylinder pressure) does not exceed the preload of the hoop spring of FIG. 5B. Accordingly, third ring 538 may be released from each of the second ring 537 and the first ring 536 the second set of springs 534. At the same time, third ring 535 may be released from each of the second ring 533 and the first ring 531 the first set of springs 534 in the second direction (e.g., second arrows 521).

In the described example above, the preload of the first set of springs 532 and the second set of springs 534 may be substantially the same. In another embodiment, the preload of the first set of springs 532 may be greater than that of the second set of springs 534. In the cases where the preload of the first set of springs 532 is different and dissimilar from that of the second set of springs 534, each of the rings of the first set of springs and the second set of springs may move distinctly. For example, the preload of the first set of springs 532 may be higher than that of the second set of springs 534. Herein, the third ring 538 may be compressed into each of the second ring 537 and the first ring 536 of the second set of springs 534 when the cylinder pressure exceeds the preload of the second set of springs 534 but does not exceed the preload of the first set of springs 532. At the same time, the first ring, second ring, and third ring of the first set of springs 532 may remain in their default expanded or released position. The third ring 535 of first set of springs 532 may be compressed into each of the second ring 533 and first ring 531 of the first set of springs 532 when cylinder pressure exceeds the preload of the first set of springs. Similarly, the rings of the first set of springs 532 and second set of springs 534 may release from each other based on cylinder pressure being lower than each of their respective preloads.

Figures 5C, 5D:
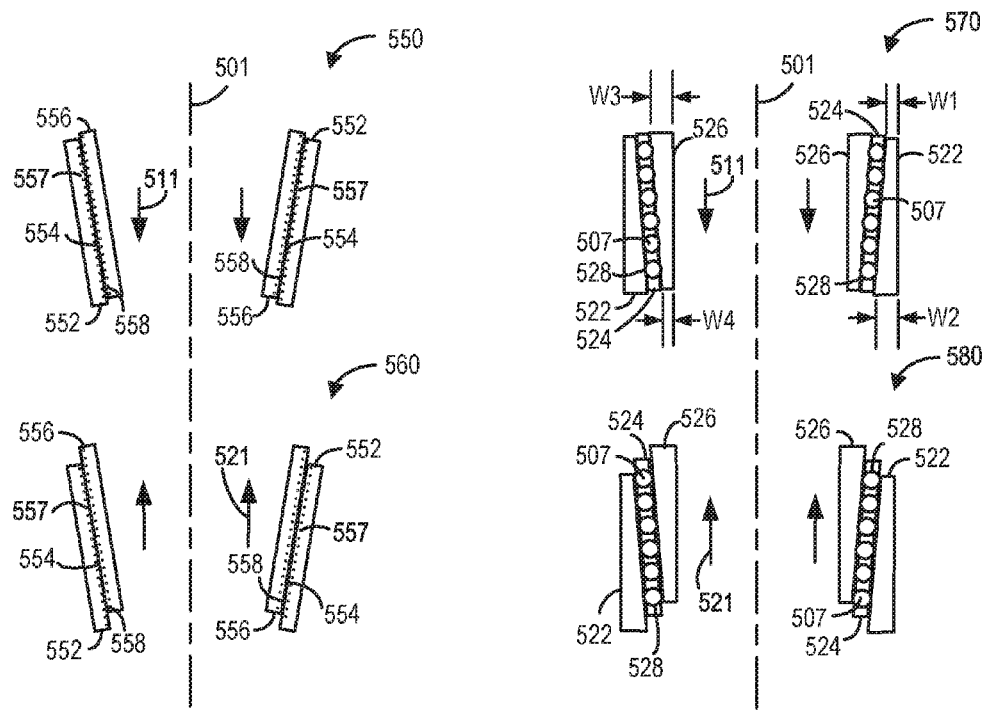

Now turning to FIG. 5C, another example hoop spring is shown, wherein the hoop spring of FIG. 5C comprises two cylindrical elements (or rings) arranged concentrically relative to central axis 501. Thus, the hoop spring of FIG. 5C includes first ring 552 and third ring 556. A second ring, as in the hoop spring 220 of FIG. 3, may not be included in this embodiment. Specifically, in the depicted embodiment, the second ring 224 of hoop spring 220 having the plurality of rolling elements 230 may not be provided. Thus, the hoop spring of FIG. 5C does not include an intermediate ring with a plurality of apertures on its circumference. In other words, the hoop spring of FIG. 5C does not include rolling elements for enabling compression and expansion of the hoop spring. To elaborate, neither first ring 552 nor third ring 556 include a plurality of apertures nor rolling elements on their respective circumferences. Further still, the first ring 552 may substantially encircle third ring 556.

As shown in FIG. 5C, the first ring 552 and third ring 556 may be direct contact with each other. However, a low friction coating 557 (indicated by dots) may be applied to an outer lateral surface 558 of the third ring 556 and/or an inner lateral surface 554 of the first ring 552. The low friction coating 557 may allow desirable hysteresis (e.g., friction and/or damping) of the hoop spring. To elaborate, the low friction coating 557 may be applied to an external circumference of third ring 556. At the same time, the low friction coating may also be applied to an internal circumference of the first ring 552. In other words, surfaces of the first ring and the third ring that are in direct contact with each other may be coated with the low friction coating. The low friction coating 557 may enable sliding between the third ring 556 and first ring 552. Specifically, the third ring 556 may slide into (compress) or out of (release from) the first ring 552.

In alternative embodiments (not shown), the low friction coating 557 may be applied to each of the plurality of rolling elements 230 in second ring 224 of hoop spring 220. As such, application of the low friction coating may facilitate sliding of the third ring 226 against the second ring 224, and the second ring 224 against the first ring 222.

In yet another embodiment (not shown), low friction coating 557 may be applied to each of the inner lateral surface 232 of the first ring 222 and the outer lateral surface 246 of the third ring 226. Herein, the hoop spring may include second ring 224 with a plurality of rolling elements 230. Further, the plurality of rolling elements 230 may not be coated with the low friction coating. As such, application of the low friction coating 557 may facilitate sliding of each of the plurality of rolling elements 230 of the second ring 224 against each of the third ring 226 and the first ring 222.

First image 550 of FIG. 5C shows the hoop spring of FIG. 5C in a compressed state. Herein, a downward force, such as from a crown of a piston shifting towards a trunk of the piston when cylinder pressure exceeds a preload of hoop spring of FIG. 5C, may be exerted on the hoop spring of FIG. 5C in the first direction (e.g., direction denoted by first arrows 511). The downward force may compress third ring 556 into the first ring 552 when the downward force exceeds the preload of the hoop spring of FIG. 5C. Specifically, outer lateral surface 558 of third ring 556 may slide over inner lateral surface 554 of first ring 552. In other words, exterior circumference of third ring 556 may glide along internal circumference of first ring 552 such that the first ring 552 encompasses third ring 556 more tightly and completely than when in the relaxed state.

Second view 560 depicts the example hoop spring of FIG. 5C in an expanded state. The expanded state may result when the downward force is lower than the preload of the hoop spring of FIG. 5C. Herein, third ring 556 may be released from the first ring 552 in the second direction (e.g., second direction denoted by second arrows 521). To elaborate, outer lateral surface 558 of third ring 556 may slide along inner lateral surface 554 of first ring 552 in the second direction. The sliding enables a release of the third ring from the first ring such that the first ring 552 may not encompass the third ring 556 as tightly as in the compressed state.

In yet another embodiment shown in first image 570 of FIG. 5D, the hoop spring includes three rings similar to hoop spring 220 of FIGS. 2, 3, and 4. Hoop spring of FIG. 5D includes first ring 522, second ring 524, and third ring 526. A circumference of second ring 524 includes multiple apertures 528 with a rolling element 507 positioned within each of the multiple apertures. Similar to hoop spring 220, the hoop spring of FIG. 5D functions with third ring 526 sliding over the plurality of rolling elements 507 of the second ring 524. Further, second ring 524 may also slide into first ring 522 due to the rolling elements. However, each of the first ring 522 and the third ring 526 of the hoop spring of FIG. 5D may be formed with variable widths. For example, a width of an upper end W1 of the first ring 522 may be less than a width of a lower end W2 of the first ring 222. As an example, the upper end of first ring 522 may indicate an end (or edge) of first ring 522 that is adjacent to roof surface 262 of crown portion 202 of piston 36 in FIG. 2. Herein, the lower end of first ring 522 may represent an end (or edge) of first ring 522 that is resting on upper rim 258 of trunk portion 250 of piston 36. Thus, the upper end of the first ring 522 may be positioned opposite the lower end of first ring 522.

Similarly, a width of an upper end W3 of the third ring 526 may be greater than a width of a lower end W4 of the third ring 226. Herein, the upper end of third ring 526 may indicate an end (or edge) of third ring 526 that is adjacent to roof surface 262 of crown portion 202 of piston 36 in FIG. 2. Further, the lower end of third ring 526 may represent an end (or edge) of third ring 526 that is resting on upper rim 258 of trunk portion 250 of piston 36. Thus, the upper end of the third ring 526 may be positioned opposite the lower end of third ring 526.

In one example, the width of the upper end W1 of the first ring 222 may be 1 mm less than the width of the lower end W2 of the first ring 522. Further, the width of the upper end W3 of the third ring 526 may be greater than the width of the lower end W4 of the third ring 526 by about 1 mm. In yet another example, the width of the upper end W1 of the first ring 522 may be smaller than the width of the lower end W2 of the first ring 522 by 3 mm. Similarly, the width of the upper end W3 of the third ring 526 may be 3 mm greater than the width of the lower end W4 of the third ring 526. In some examples, a width of the second ring 524 may also be varied. In this way, a cross-section of each ring of the hoop spring of FIG. 5D may be varied.

First image 570 of FIG. 5D shows the hoop spring of FIG. 5D in a compressed state wherein a downward force (due to higher cylinder pressure) may be exerted on the hoop spring in the first direction (e.g., first arrows 511). The downward force in the first direction may compress third ring 526 into each of the second ring 524 and the first ring 522 when the downward force (e.g., cylinder pressure) exceeds the preload of the hoop spring of FIG. 5D. The third ring 526 may slide over the plurality of rolling elements 507 of second ring 524 as the hoop spring is compressed. Since the widths of each ring of the hoop spring of FIG. 5D are different, the compression capability of this hoop spring may be considerably different from that of hoop spring 220 of FIG. 3. For example, hoop spring of FIG. 5D may be stiffer relative to hoop spring 200 of FIGS. 2 and 3.

Second image 580 of FIG. 5d depicts the example hoop spring in an expanded state. Second image 580 illustrates a situation when the downward force is lower than the preload of the hoop spring of FIG. 5D. For example, pressure in the cylinder may be lower than the preload of hoop spring of FIG. 5D. Herein, third ring 526 may be released from the first ring 522 in the second direction (e.g., second arrows 521). As such, third ring 526 may shift away from first ring 522 when the downward force is lower than the preload of the hoop spring enabling a shift of the crown portion of the piston away from the trunk portion of the piston.

In this way, different embodiments of the hoop spring may be contemplated. In one example, a number of rings of the hoop spring (e.g., as shown in FIG. 5A) may be modified. For example, the number of rings in the hoop spring may be increased or decreased. In another example, the widths of each of the rings of the hoop spring (as shown in FIG. 5D0 may be changed. In yet another example, additives, such as low friction coatings, may be applied on face-sharing contact surfaces of the rings and rolling elements may not be utilized. In still another example, the rings of the hoop spring may be arranged in a nested manner as shown in FIG. 5A. In a further example, multiple sets of the hoop spring (such as hoop spring 220) may be arranged concentrically. The aforementioned modifications to the hoop spring may achieve a desired spring rate and/or preload. Further, a profile (linear, progressive, etc.) and cross-section (constant, increasing/decreasing, etc.) of the hoop spring may also be adjusted depending on desired spring characteristics. As a result, engine efficiency may be improved. Turning now to FIG. 6, a sectional view of an example piston, such as piston 36, is shown schematically. The piston comprises an upper crown portion (e.g., crown portion 202), a lower trunk portion, (e.g., trunk portion 250), and a spring (e.g., hoop spring 220) mounted therebetween atop the trunk portion and within the crown portion. Hoop spring 220 is shown in a first state, or compressed position in FIG. 6A, while FIG. 6B depicts hoop spring 220 in a second state, or expanded position. The position of hoop spring 220 may be related to a position of the crown portion 202 relative to the position of the trunk portion 250 of piston 36. During an engine cycle, hoop spring 220 in piston 36 may be in the first state, the second state, and/or any intermediate state therebetween, depending on one or more engine operating conditions.

As shown in FIG. 6A, hoop spring 220 is in the compressed position. Further, piston 36 is also in the compressed position such that lower rim 264 of crown portion 202 abuts against the upper rim 258 of trunk portion 250. As described earlier, the hoop spring may be compressed when a pressure in the cylinder is higher than a preload on the hoop spring. To elaborate, as cylinder pressure exceeds the preload of the hoop spring, the crown portion of the piston may be displaced towards the trunk portion of the piston causing compression of the hoop spring.

FIG. 6A shows a gap between lower rim 264 of crown portion 202 and upper rim of trunk portion 250 for clarifying the contact between the two rims. However, in actuality, the lower rim 264 of crown portion 202 and upper rim of trunk portion 250 may be substantially in direct contact with each other. Accordingly, a distance D between the lower rim 264 of crown portion 202 and the upper rim 258 of trunk portion 250 may be substantially zero. When the hoop spring 220 within the crown portion 202 is compressed in the compressed position of the piston, each of the second ring 224 and the third ring 226 of hoop spring 220 may be pressed into the first ring 222 of hoop spring 220.

In the depicted example of FIG. 6A, roof surface 262 of crown portion 202 may exert a downward force on hoop spring 220 in the first direction towards the trunk portion 250, denoted herein as first arrows 511. Specifically, the third annular element (or third ring 226) of hoop spring 220 may be pressed into each of the second annular element (or second ring 224) and the first annular element (or first ring 222). Further, the third annular element may move past the plurality of rolling elements in the second annular element in the first direction such that the third annular element may be circumferentially enclosed by the second annular element. The described position of the hoop spring may occur during one or more strokes of the piston, such as a power stroke when cylinder pressure is higher than the preload on the hoop spring.

In one embodiment, the crown portion 202 may exert the downward force in the first direction during one or more operating conditions (e.g., higher engine loads), and one or more strokes of the cylinder cycle. For example, when an engine load exceeds a load threshold, cylinder pressure within the combustion chamber may increase. As a result, the increased cylinder pressure may apply a force on the crown portion 202 exceeding the preload of the hoop spring 220, as discussed in reference to FIG. 2. Accordingly, hoop spring 220 may be compressed and compacted together as shown in FIG. 6A.

The compressed position of piston 36 may allow an increased volume in the combustion chamber, such as cylinder 30 of FIG. 1, during an expansion stroke in the cylinder cycle, for example. As such, the increased volume in cylinder 30 may lead to a lower compression ratio. In one example, the lower compression ratio may be approximately 9.5:1. In this way, risk of knock and excessive thermal load caused by an increased cylinder pressure during higher engine load conditions may be lessened. As such, arranging the hoop spring 220 within the crown portion 202 may reduce impact shock between lower rim 264 of the crown portion 202 and upper rim 258 of the trunk portion 250 when distance D is decreasing. This reduction of impact shock is due to the hoop spring 220 having a specific spring rate and preload. Specifically, the spring rate and preload of hoop spring 220 may be selected such that crown portion 202 will move to the compressed position when a cylinder pressure exceeds a predetermined threshold e.g. preload of hoop spring 220.

FIG. 6B shows the example piston in an extended, or released, state with hoop spring 220 at an expanded position. It will be noted that the released position of the hoop spring (and piston) may be assumed when cylinder pressure is lower than the preload on the hoop spring 220. Herein, lower rim 264 of crown portion 202 does not contact the upper rim 258 of trunk portion 250. In other words, a base of crown portion 202 is separated from trunk portion 250 by distance D1. As such, distance D1 may be greater than distance D in FIG. 6A. In one example, distance D1 between the lower rim 264 of crown portion 202 and the upper rim 258 of trunk portion 250 may be 3 mm. In another example, the distance D1 may be greater than 4 mm. In another example, the distance D1 may be greater than 5 mm. In yet another example, distance D1 may be a distance between 3 and 4 mm.

When piston 36 is in the expanded position, hoop spring 220 within the crown portion 202 may not be in the compressed state, as described in reference to FIG. 2. For example, when cylinder pressure reduces below the preload of the hoop spring, the rings of the hoop spring may release from each other (e.g., spread apart) allowing the hoop spring to assume an expanded position as shown in FIG. 6B. In the expanded position of the hoop spring 220, the third ring 226 may be released from each of the second ring 224 and the first ring 222. Further, the second ring 224 moves in the second direction, and the third ring 226 moves in the same, second direction. As stated above, the second direction may be towards crown portion 202 of piston 36, denoted here as second arrows 521. As such, the second direction may be the opposite of the first direction.

In one embodiment, the hoop spring 220 may exert an upward force on the crown portion 202 in the second direction during one or more operating conditions, and one or more strokes of the cylinder cycle. For example, when an engine load is lower, cylinder pressure within the combustion chamber may reduce. As a result, the spring assembly may release from its compressed state and exert a force on the crown portion 202 away from trunk portion 250 of piston 36, as discussed in reference to FIG. 2. Accordingly, hoop spring 220 may be expanded, such that the third ring 226 is at least partially released from second ring 224, and second ring 224 is at least partially released from the first ring 222, as shown in FIG. 6B.

In sum, the expanded position may enable a higher compression ratio as compared to when the piston is in compressed position (FIG. 6A). In one example, the higher compression ratio may be approximately 13.5:1. As shown in FIG. 6B, crown portion 202 is positioned at distance D1 from trunk portion 250 as compared to the piston in the compressed position. As such, hoop spring 220 is in a relatively extended position since the roof surface 262 of crown portion 202 may no longer be applying a downward force on the upper rim 238 of the third ring 226 greater than the preload of the spring assembly.

As such, the expanded position of piston 36 may allow a decreased volume in the combustion chamber, such as cylinder 30 of FIG. 1. The decreased volume in cylinder 30 may lead to a higher compression ratio. In this way, engine efficiency may be increased, thereby increasing fuel economy.

Accordingly, FIGS. 6A and 6B illustrate adjustments to the position of the crown of the piston relative to the position of the trunk portion of the piston. In one example, the adjustments may include decreasing a distance (e.g., distance D1) between the crown of the piston and the trunk of the piston by compressing the third annular element (e.g., third ring 226) into each of the second annular element (e.g., second ring 224) and the first annular element (e.g., first ring 222), the third annular element moving past the plurality of rolling elements (e.g., rolling elements 230) in the second annular element in a first direction such that the third annular element may be circumferentially enclosed (e.g., substantially) by the second annular element.

In another example, the adjustments may include increasing a distance between the crown of the piston and the trunk of the piston by releasing the third annular element from each of the second annular element and the first annular element, wherein the third annular element moves past the plurality of rolling elements in the second annular element in a second direction during a second stroke of the piston, the second direction opposite to the first direction.

Thus, systems and methods are provided, comprising varying a compression ratio of an engine via a spring assembly located in a crown of a piston in a cylinder of the engine, the spring assembly comprising a first annular element fitted inside a second annular element, and a third annular element enclosing the second annular element, wherein the second annular element includes a plurality of apertures with a rolling element positioned within each of the plurality of apertures. In one embodiment, the spring assembly may have a preload. Further, as shown in FIGS. 2-5, a central axis of the first annular element may be parallel to each of a central axis of the second annular element and a central axis of the third annular element.

In one embodiment, varying the compression ratio of the engine may include adjusting a position of the crown of the piston relative to a position of a trunk of the piston. Further, adjusting the position of the crown of the piston relative to the position of the trunk of the piston may include decreasing a distance between the crown of the piston and the trunk of the piston. More specifically, in one example, decreasing the distance between the crown of the piston and the trunk of the piston may include compressing the first annular element into each of the second annular element and the third annular element, the first annular element moving past the plurality of rolling elements in the second annular element such that the first annular element may be circumferentially enclosed by the second annular element.

Further, adjusting the position of the crown of the piston relative to the position of the trunk of the piston may also include increasing the distance between the crown of the piston and the trunk of the piston. In this example, increasing the distance between the crown of the piston and the trunk of the piston may include releasing the first annular element from each of the second annular element and the third annular element, wherein the first annular element moves past the plurality of rolling elements in the second annular element in a direction away from each of the second annular element and the third annular element.

Figure 7:
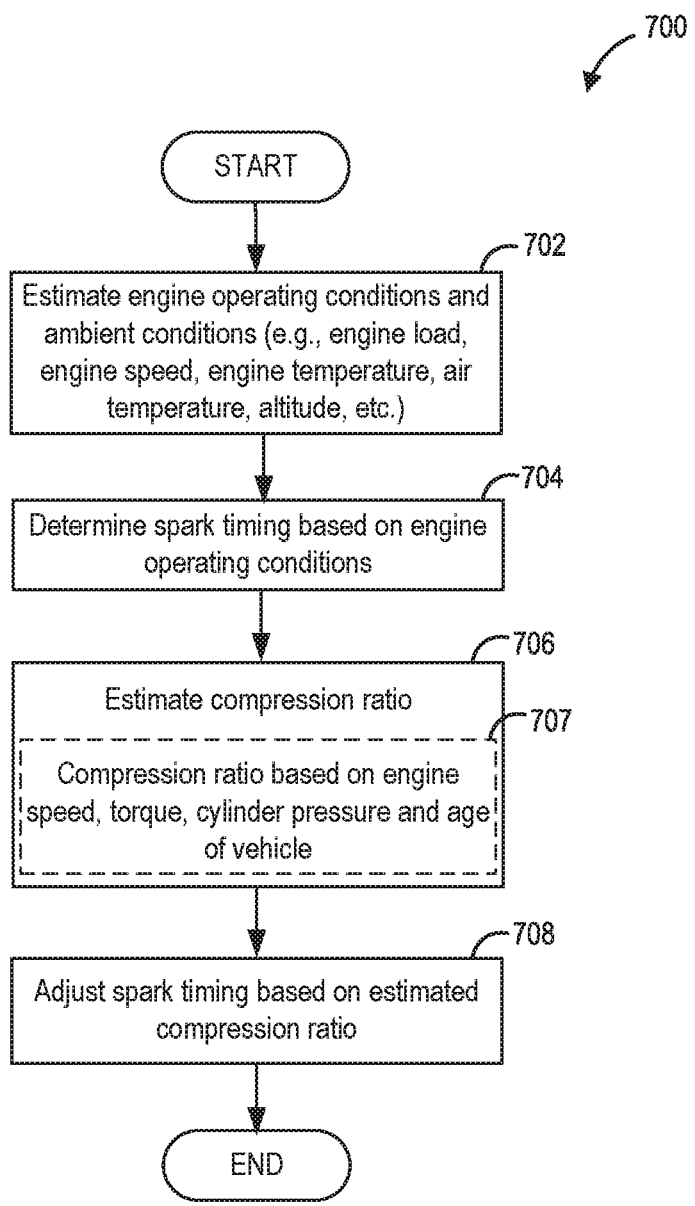
FIG. 7 is an example flow chart showing adjustments to spark timing based on an estimated compression ratio of the engine.

FIG. 7 shows an example routine 700 for adjusting spark timing responsive to an estimated compression ratio in an engine, such as engine 10 of FIG. 1. Specifically, a first setting for spark timing may be determined based on existing engine conditions. The first setting may be adjusted further based on the estimated compression ratio in the engine.

Instructions for carrying out routine 700 may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system to adjust engine operation according to the routine described below.

At 702, routine 700 estimates and/or measures engine operating conditions. Engine operating conditions may include engine speed, engine load, engine temperature, age of the engine, etc. The age of the engine may be determined based on a mileage of the vehicle since engine manufacture. Alternatively, age of the engine may be based on a number of combustion events. In addition, at 702, routine 700 estimates ambient conditions such as ambient temperature and humidity, barometric pressure, etc.

Next, at 704, routine 700 determines a first setting for spark timing based on engine operating conditions measured and/or estimated at 702. In particular, the first setting for spark timing may be a function of the measured engine speed and estimated engine load. Additional parameters such as exhaust gas recirculation (EGR), altitude, air temperature, etc. may also determine the first setting for spark timing. In one example, engine load may be estimated by a sensor (not shown) which measures an amount of vacuum produced by the engine. In another example, the engine speed may be measured by a crankshaft position sensor, such as Hall Effect sensor 118 of FIG. 1, detecting an angular rotational speed of the engine crankshaft in revolutions per minute.

At 706, routine 700 estimates a change in compression ratio of the engine. At 707, compression ratio of the engine may depend upon engine speed, engine torque, and cylinder pressure, as well as compression of the hoop springs within each piston of the engine. Herein, compression of the hoop springs may be affected by wear and degradation of the components of the hoop spring. Accordingly, routine 700 estimates the age of the engine to determine functionality and robustness of the hoop spring. As mentioned earlier, the age of the engine may be determined based on engine operation since a date of engine manufacture. In another example, the age of the engine may also be learned by vehicle mileage. In particular, the age of the engine may help infer performance of the hoop spring, and thus an estimation of preload and elasticity of the hoop springs in each piston. Over time, the preload and/or spring rate of the hoop spring may change. In one example, the preload and/or spring rate of the hoop spring may decrease as the age of the engine increases. Therefore, an ability of the hoop spring to adjust engine compression ratio may decline.

After the change in compression ratio is determined at 706, routine 700 adjusts the first setting for spark timing at 708 based on the estimated change in compression ratio. Spark timing may be adjusted (e.g., advanced or retarded) based on compression ratio to maintain or increase engine efficiency and performance, while reducing a risk of knock. In one example, spark timing may be adjusted uniformly for all cylinders. In another example, spark timing may be adjusted to provide cylinder-by-cylinder control of spark timing in order to equalize burn-rates or to retard the spark for knock-prone cylinders.

After any adjustment(s) to spark-timing are completed by the controller, routine 600 ends. In this way, engine efficiency and engine performance may be increased by adjusting spark timing based on the variable compression ratio of the engine and specifically, the performance of the hoop spring.

Thus, a method may be provided, comprising operating an engine with a first setting for spark timing, the engine including a cylinder, and the cylinder including a piston with a spring positioned in a crown of the piston, and adjusting the first setting for spark timing responsive to an estimated compression ratio of the engine, the compression ratio based on an age of the spring. In one example, the age of the spring may be based on an age of the engine, the age of the engine based on a number of engine cycles. In another example, the compression ratio may be further based on one or more of an engine speed and a pressure in the cylinder of the engine.

In another example, the method may also comprise adjusting a spark timing based on the varying compression ratio of the engine, the varying of the compression ratio based upon an engine speed, a pressure in each cylinder of the engine, and an age of the engine. Accordingly, the age of the engine determines a robustness of the spring assembly.

Further, the spring may include a first ring, a second ring, and a third ring arranged in a concentric manner. Specifically, the third ring may be substantially surrounded by the second ring, and the second ring may be substantially surrounded by the first ring. Further, the circumference of the second ring may comprise a plurality of apertures, while a circumference of the first ring and a circumference of the third ring may not include a plurality of apertures. In the second ring, a rolling element may be retained in each of the plurality of apertures.

In one embodiment, the spring may have a preload. During some conditions, the spring may be compressed in response to the pressure in the cylinder being higher than the preload. In this example, the third ring may be pressed into each of the second ring and the first ring, the third ring sliding on rolling elements positioned in the plurality of apertures in the second ring as a distance between the crown of the piston and a piston trunk decreases.

During other conditions, the third ring 226 may release from each of the second ring 224 and the first ring 222 in response to the pressure in the cylinder being lower than the preload, the third ring 226 sliding on the rolling elements positioned in the plurality of apertures in the second ring. In this example, the release of the third ring and second ring from the first ring may increase a distance between the piston crown and the piston trunk.

The technical effect of implementation of a hoop spring comprising a first ring, a second ring, and a third ring within a piston crown may be an improvement to engine efficiency and fuel economy. The improvement to engine efficiency and fuel economy is due, in part, by beneficial load deflection, or spring rate, characteristics of the hoop spring, a more even stress distribution, as well as a reduction in piston weight and package size of the engine due to the hoop spring having less mass and size as compared to the Belleville washers. Further, the more even stress distribution of the hoop spring may increase fatigue life due to a higher durability as compared to the Belleville springs. As a result, the higher engine efficiency resulting from a higher compression ratio during low loads may be combined with the knock control available with a lower compression ratio in a PRP system. Thus, the use of expensive, higher-octane fuels may be avoided.

In another representation, a system may be provided, comprising, an engine including a cylinder, a piston reciprocating within the cylinder, the piston including a piston crown and a piston trunk, a connecting rod, a first end of the connecting rod coupled to the piston trunk via a wrist pin, a second end of the connecting rod coupled to a crank pin of a crankshaft of the engine, and a spring situated on a top surface of the piston trunk and surrounded by the piston crown, the spring formed of a first ring, a second ring, and a third ring arranged in a concentric manner, wherein the third ring may be nested within the second ring, and the second ring may be nested within the first ring, a circumference of the second ring including multiple apertures, and a circumference of the first ring and a circumference of the third ring not including multiple apertures.

Further, in one example, each of the multiple apertures on the circumference of the second ring may include a rolling element, and each of the first ring, the second ring, and the third ring may be tapered. In addition, the second ring may be formed of a polymer material while each of the first ring and the third ring may be formed of a metal.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a piston crown; and
   a spring positioned within the piston crown, the spring including a first ring, a second ring comprising a plurality of apertures, a rolling element positioned within each of the plurality of apertures, and a third ring, wherein the first ring, the second ring, and the third ring are arranged concentrically with the second ring positioned between the first ring and the third ring.

2. The system of claim 1, wherein the first ring is in direct contact with the second ring, and not in direct contact with the third ring, and wherein the third ring is in direct contact with the second ring but not in direct contact with the first ring.

3. The system of claim 2, wherein a central axis of the first ring is parallel to each of a central axis of the second ring and a central axis of the third ring.

4. The system of claim 3, wherein each of the first ring, the second ring, and the third ring are shaped as tapered cylinders.

5. The system of claim 4, wherein each of the first ring and the third ring are made of steel, and the second ring is made of a polymer.

6. The system of claim 5, wherein a central axis of the piston crown coincides with each of the central axis of the first ring, the central axis of the second ring, and the central axis of the third ring.

7. The system of claim 6, further comprising a piston trunk coupled to a base of the piston crown, and wherein the spring is positioned on a top of the piston trunk.

8. The system of claim 7, wherein the piston crown is movable relative to the piston trunk, and wherein the piston trunk is fixed relative to the piston crown.

9. A method, comprising:
varying a compression ratio of an engine via a spring assembly located in a crown of a piston in a cylinder of the engine, the spring assembly comprising a third annular element fitted inside a second annular element, and a first annular element enclosing the second annular element, wherein the second annular element includes a plurality of apertures with a rolling element positioned within each of the plurality of apertures.

10. The method of claim 9, wherein a central axis of the first annular element is parallel to each of a central axis of the second annular element and a central axis of the third annular element.

11. The method of claim 10, wherein varying the compression ratio of the engine includes adjusting a position of the crown of the piston relative to a position of a trunk of the piston, and wherein the spring assembly has a preload.

12. The method of claim 11, wherein adjusting the position of the crown of the piston relative to the position of the trunk of the piston includes decreasing a distance between the crown of the piston and the trunk of the piston, the decreasing including compressing the third annular element into each of the second annular element and the first annular element, the third annular element moving past the plurality of rolling elements in the second annular element such that the third annular element is circumferentially enclosed by the second annular element.

13. The method of claim 12, wherein adjusting the position of the crown of the piston relative to the position of the trunk of the piston includes increasing the distance between the crown of the piston and the trunk of the piston, the increasing including releasing the third annular element from each of the second annular element and the first annular element, wherein the third annular element moves past the plurality of rolling elements in the second annular element in a direction away from each of the second annular element and the first annular element.

14. The method of claim 9, further comprising adjusting a spark timing based on the varying compression ratio of the engine, the varying compression ratio based upon an engine speed, a pressure in each cylinder of the engine, and an age of the engine, and wherein the age of the engine determines a robustness of the spring assembly.

* * * * *